(12) United States Patent
Yasutake et al.

(10) Patent No.: US 7,548,806 B2
(45) Date of Patent: Jun. 16, 2009

(54) MOTION CONTROL SYSTEM FOR VEHICLE (75) Inventors: Toshio Yasutake, Nagoya (JP);
Toshihisa Kato, Handa (JP)

(73) Assignee: Advics Co., Ltd., Kariya, Aichi-Pref. (JP)

(*) Notice: Subject to any disclaimer, the term of this patent is extended or adjusted under 35 U.S.C. 154(b) by 162 days.

(21) Appl. No.: 11/637,162

(22) Filed: Dec. 12, 2006

(65) Prior Publication Data

US 2007/0162203 A1 Jul. 12, 2007

(30) Foreign Application Priority Data

Jan. 11, 2006 (JP) ............................. 2006-004141

(51) Int. Cl.
*B60G 17/016* (2006.01)
*B60G 17/0185* (2006.01)
*G06F 7/00* (2006.01)
*G06F 17/00* (2006.01)
*G06F 7/70* (2006.01)
*G06G 7/00* (2006.01)
*G06G 7/76* (2006.01)
*B60T 8/24* (2006.01)
*B60T 7/12* (2006.01)
*G06G 1/00* (2006.01)
*G05F 7/00* (2006.01)

(52) U.S. Cl. ............................. 701/38; 701/36; 701/39; 701/69; 701/70; 701/72; 701/75

(58) Field of Classification Search .................. 701/39, 701/83, 94
See application file for complete search history.

(56) References Cited

U.S. PATENT DOCUMENTS

| 5,259,476 | A | * | 11/1993 | Matsuno et al. | ............. | 180/197 |
| 6,324,458 | B1 | | 11/2001 | Takagi et al. | | |
| 6,904,991 | B2 | * | 6/2005 | Barth et al. | ................. | 180/197 |
| 7,027,902 | B2 | * | 4/2006 | Lu et al. | ....................... | 701/36 |
| 7,302,331 | B2 | * | 11/2007 | Meyers et al. | ................. | 701/71 |

FOREIGN PATENT DOCUMENTS

JP    3463622 B2    8/2003

* cited by examiner

*Primary Examiner*—Thomas G Black
*Assistant Examiner*—Sze-Hon Kong
(74) *Attorney, Agent, or Firm*—Buchanan Ingersoll & Rooney PC (57) ABSTRACT

In a motion control system for a vehicle having four wheels including at least two driving wheels which is driven by a driving power source, first rolling liability judging means (step 112) judges whether or not the rolling liability detected by rolling liability detecting means (step 102, a lateral acceleration sensor 39) for detecting the rolling liability of the vehicle is equal to or greater than a first predetermined rolling liability, and rolling suppression control means (steps 116, 124 to 129) suppresses the rolling liability of the vehicle by increasing the driving force of any of the driving wheels when the first rolling liability judging means judges that the rolling liability detected by the rolling liability detecting means is equal to or greater than the first predetermined rolling liability.

10 Claims, 5 Drawing Sheets

MOTION CONTROL SYSTEM FOR VEHICLE

INCORPORATION BY REFERENCE

This application is based on and claims priority under 35 U.S.C. 119 with respect to Japanese Application No. 2006-004141 filed on Jan. 11, 2006, the entire content of which is incorporated herein by reference.

BACKGROUND OF THE INVENTION

1. Field of the Invention

The present invention relates to a motion control system for a vehicle having at least two driving wheels driven by a driving power source such as, e.g., a combustion engine or an electric motor.

2. Discussion of the Related Art

Heretofore, as a motion control system for a two-wheeled vehicle or a four-wheeled vehicle, there has been known a "Behavior Control Device for Vehicle" described in Japanese Patent No. 3463622 (equivalent of U.S. Pat. No. 6,324,458 B1). In the behavior control device, it is judged whether the rolling liability detected by rolling liability detecting means for detecting the rolling liability of a vehicle is equal to or greater than a predetermined rolling liability or not, and when the rolling liability detected by the rolling liability detecting means is equal to or greater than the predetermined rolling liability, control is performed to suppress the rolling liability of the vehicle.

More specifically, the output torque of an engine 10 is controlled to become a target output torque which is adjustably decreased by an output torque regulation amount ΔTe, whereby the vehicle is decelerated (step 250) to suppress the rolling liability of the vehicle.

Further, a hydraulic circuit 44 is controlled on the basis of brake control amounts Fbi, and the brake forces to respective wheels are controlled in dependence on the respective brake control amounts Fbi for the respective wheels under the control of wheel speed feedback or brake pressure feedback, whereby the rolling liability of the vehicle is suppressed. That is, the brake control amounts Fbfdi for the respective wheels are calculated so that the vehicle is decelerated and is given a yaw moment in the direction toward decreasing the turn yaw moment without suffering the spinning of the vehicle body, for example, so that predetermined brake forces are applied to the wheels except for an inside front wheel during a turn.

By the way, in the aforementioned behavior control device, a large effect in suppressing an over-rolling has been obtained by lowing the engine output or by applying brake forces to predetermined wheels when the over-rolling occurs on the vehicle. Thus, since the feeling about the deceleration of the vehicle (the feeling about the operation under a rolling suppression control) is also strong, there arise a problem that the drive feeling is deteriorated to make the driver have an unpleasant feeling against his manipulation. Further, since the rolling suppression control is made to begin with a substantial delay in order that the timing at which such a bad drive feeling is given is to be delayed as long as possible, there arises an additional problem that the rolling suppression control is started for the first time after the rolling becomes excessive.

SUMMARY OF THE INVENTION

Accordingly, it is a primary object of the present invention to provide an improved motion control system for a vehicle, capable of performing a rolling suppression control of a less unpleasant feeling to the driver from an early stage of the rolling occurrence which stage is before the rolling becomes large so that a good drive feeling is given to the driver.

Briefly, according to the present invention, there is provided a motion control system for a vehicle having at least two driving wheels which is driven by a driving power source. The system comprises rolling liability detecting means for detecting the rolling liability of the vehicle; first rolling liability judging means for judging whether or not the rolling liability detected by the rolling liability detecting means is equal to or greater than a first predetermined rolling liability; and rolling suppression control means for suppressing the rolling liability of the vehicle by increasing the driving force of any of the driving wheels when the first rolling liability judging means judges that the rolling liability detected by the rolling liability detecting means is equal to or greater than the first predetermined rolling liability.

With this construction, the first rolling liability judging means judges whether or not the rolling liability detected by the rolling liability detecting means for detecting the rolling liability of the vehicle is equal to or greater than the first predetermined rolling liability, and the rolling suppression control means suppresses the rolling liability of the vehicle by increasing the driving force of any of the driving wheels when the first rolling liability judging means judges that the rolling liability detected by the rolling liability detecting means is equal to or greater than the first predetermined rolling liability. Thus, when the rolling liability of the vehicle becomes equal to or greater than the first predetermined rolling liability as a result that the vehicle begins to turn with a gas pedal being stepped by the driver or in the traveling by inertia of the vehicle with a brake pedal being not stepped, control is performed to suppress the rolling liability of the vehicle by increasing the driving force of any such driving wheel. Consequently, the control which is capable of suppressing the rolling liability of the vehicle without substantially giving the driver an unpleasant feeling is performed from an early stage of the rolling occurrence before the rolling becomes large, so that a good drive feeling can be given to the driver.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which:

FIG. 6 is a map showing the respective relations between the rolling liability and various control amounts including the increase control amount of the engine torque and the like;

DETAILED DESCRIPTION OF THE PREFERRED EMBODIMENT

Figure 1:
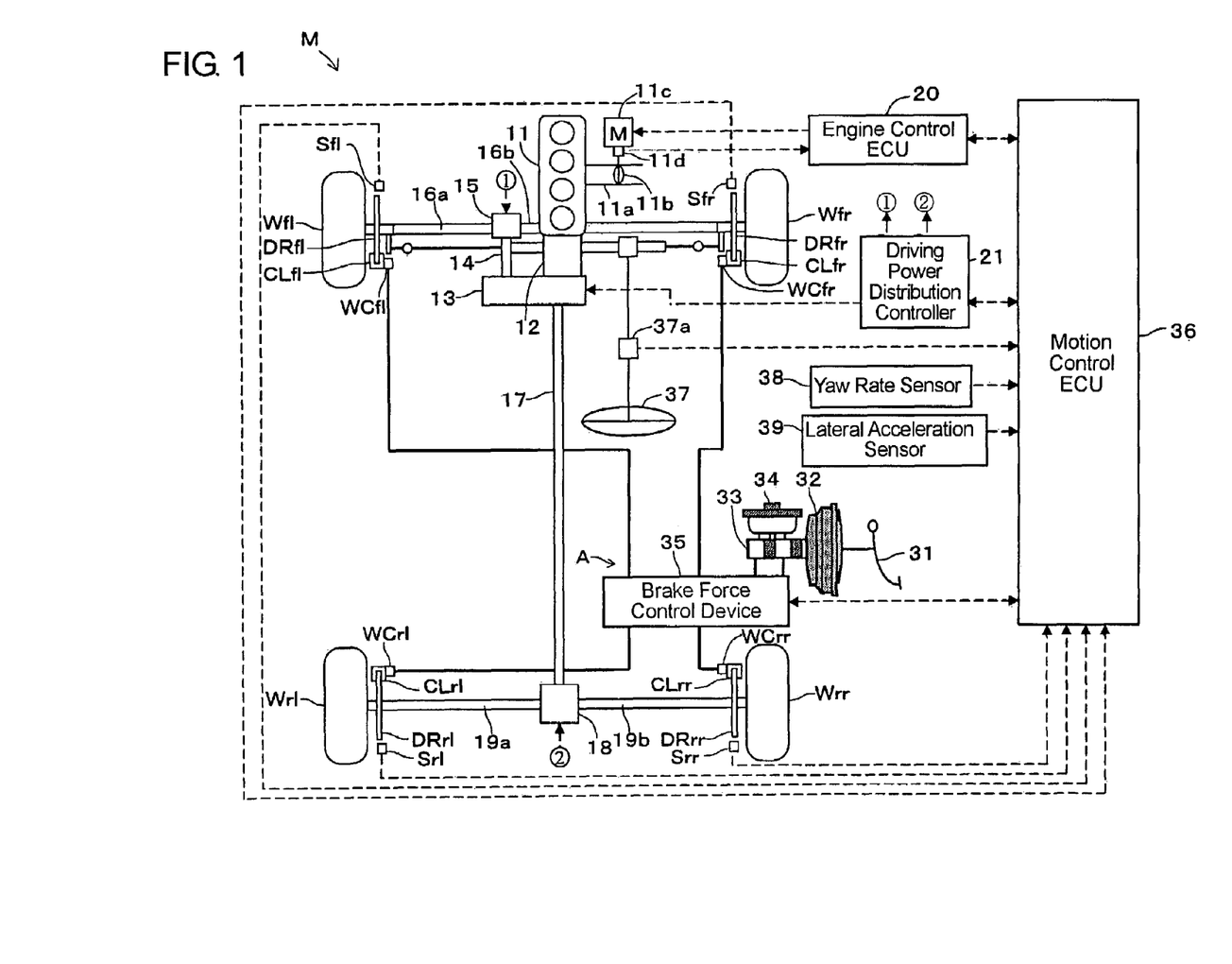
FIG. 1 is a schematic view showing one embodiment of a vehicle to which a motion control system according to the present invention is applied.

Hereinafter, one embodiment of a vehicle to which a motion control system according to the present invention is applied will be described with reference to the accompanying drawings. FIG. 1 is a schematic view showing the construction of the vehicle. The vehicle M is a four-wheel drive vehicle of a front wheel drive base which takes front wheels as primary driving wheels and rear wheels as secondary driving wheels, and is of the type that the driving power of an engine 11 which is mounted as driving power source on the front part of a vehicle body is transmitted to the four wheels. In a modified form, the vehicle may not be a four-wheel drive vehicle of the front drive base, but may be a four-wheel drive vehicle of a rear drive base. Further, in a further modified form, the vehicle may not be a four-wheel drive vehicle, but may be a vehicle of another drive type such as, for example, a rear wheel drive vehicle or a front wheel drive vehicle.

The vehicle M is provided with a motion control system, which is provided with the engine 11, a transmission 12, a front-rear driving power distribution control actuator (front-rear driving power distribution control means) 13, a front propeller shaft 14, a front left-right driving power distribution control actuator (front-left driving power distribution means) 15, left and right front drive shafts 16a, 16b, a rear propeller shaft 17, a rear left-right driving power distribution control actuator (left-right driving power distribution means) 18, left and right rear drive shafts 19a, 19b, an engine control ECU 20 and a driving power distribution controller 21.

The driving power from the engine 11 is speed-changed by the transmission 12 and is transmitted to the front propeller shaft 14 and the rear propeller shaft 17 at a driving power distribution ratio determined by the front-rear driving power distribution control actuator 13. The driving power transmitted to the front propeller shaft 14 is transmitted to the left and right front wheels Wfl, Wfr respectively through the left and right front drive shafts 16a, 16b at a driving power distribution ratio determined by the front left-right driving power distribution control actuator 15. The driving power transmitted to the rear propeller shaft 17 is transmitted to the left and right rear wheels Wrl, Wrr respectively through the left and right rear drive shafts 19a, 19b at a driving power distribution ratio determined by the rear left-right driving power distribution control actuator 18.

The engine 11 is provided with an intake pipe 11a for admitting air into combustion chambers of the engine 11, and the intake pipe 11a is provided therein with a throttle valve 11b which regulates the air volume passing through the intake pipe 11a by adjusting the open/close amount of the intake pipe 11a. The throttle valve 11b is opened and closed by being driven by a motor 11c which responds to a command from the engine control ECU 20. The open/close amount of the throttle valve 11b is detected by a throttle opening degree sensor 11d, and a feedback control is performed so that a detection signal from the sensor 11d is transmitted to the engine control ECU 20 to make a command value from the engine control ECU 20. The fuel supply to the engine 11 is automatically performed in dependence on the open/close amount of the throttle valve 11b, that is, the intake air volume. With this construction, as the opening degree of the throttle valve 11b increases, the output power of the engine 11 is increased to increase the driving forces of the driving wheels. On the contrary, as the opening degree of the throttle valve 11b decreases, the output power of the engine 11 is decreased to decrease the driving forces of the driving wheels.

In this way, driving power source control means is constituted by the throttle valve 11b, the motor 11c and the throttle opening degree sensor 11d. As is clear from the forgoing explanation, the driving power source control means is capable of controlling the driving power of the engine as the driving power source regardless of the manipulation by the driver.

The front-rear driving power distribution control actuator (front-rear driving power distribution control means) 13 is able to change the ratio of the driving power applied to the front wheels Wfl, Wfr to the driving power applied to the rear wheels Wrl, Wrr (i.e., driving power distribution ratio) within a predetermined range. In this particular embodiment, because the vehicle M is of the front drive base, the ratio of the driving power applied to the front wheels Wfl, Wfr to the driving power applied to the rear wheels Wrl, Wrr is changeable in a range of 100:0 to 50:50. For example, the front-rear driving power distribution control actuator 13 has a hydraulic clutch, wherein the driving power distribution ratio becomes 100:0 when the hydraulic clutch is brought into the disengaging state, whereas it becomes 50:50 when the hydraulic clutch is brought into the engaging state. The front-rear driving power distribution control actuator 13 serves to distribute the driving power to the front wheels Wfl, Wfr and the rear wheels Wrl, Wrr in accordance with a driving power distribution command from the driving power distribution controller 21.

The front left-right driving power distribution control actuator (left-right driving power distribution control means) 15 is able to change the ratio of the driving power applied to the left front wheel Wfl to the driving power applied to the right front wheel Wrr (i.e., driving power distribution ratio) within another predetermined range. In this particular embodiment, the ratio of the driving power applied to the left front wheel Wfl to the driving power applied to the right front wheel Wrr is changeable in a range of 100:0 to 0:100. For example, the front left-right driving power distribution control actuator 15 has a hydraulic clutch, wherein the driving power distribution ratio becomes 100:0 (or 0:100) when the hydraulic clutch is brought into the disengaging state, whereas it becomes 50:50 when the hydraulic clutch is brought into the engaging state. The front left-right driving power distribution control actuator 15 serves to distribute the driving power to the left front wheel Wfl and the right front wheel Wrr in accordance with a driving power distribution command from the driving power distribution controller 21. Further, the rear left-right driving power distribution control actuator (left-right driving power distribution means) 18 takes the same construction as the front left-right driving power distribution control actuator 15 and serves to distribute the driving power to the left rear wheel Wrl and the right rear wheel Wrr in accordance with a driving power distribution command from the driving power distribution controller 21.

Further, the motion control system for the vehicle is provided with a hydraulic brake system A for braking the vehicle by applying hydraulic brake forces directly to the respective wheels Wfl, Wfr, Wrl, Wrr. The hydraulic brake system A is composed of a vacuum type booster 32 being a booster device for assisting and boosting (augmenting) a braking manipulation force which is generated upon stepping a brake pedal 31, by applying the intake vacuum pressure of the engine 11 to a diaphragm; a master cylinder 33 for generating brake fluid (oil) of the hydraulic pressure (oil pressure) which is a base hydraulic pressure depending on the braking manipulation force (e.g., the manipulation state of the brake pedal 31) boosted by the vacuum type booster 32 and for supplying the generated brake fluid to the respective wheel cylinders WCfl, WCfr, WCrl, WCrr; a reservoir tank 34 for storing brake fluid to replenish the same to the master cylinder 33; and a brake actuator (brake force control device as brake force control means) 35 provided between the master cylinder 33 and the respective wheel cylinders WCfl, WCfr, WCrl, WCrr for generating controlled hydraulic pressures independently of the stepping state of the brake pedal 31 to apply the controlled hydraulic pressures to the controlled object wheels.

The respective wheel cylinders WCfl, WCfr, WCrl, WCrr are provided with respective calipers CLfl, CLfr, CLrl, CLrr, each of which houses a pair of pistons (not shown) slidable fluid-tightly therein. When the base hydraulic pressure or controlled hydraulic pressure is supplied to each of the wheel cylinders WCfl, WCfr, WCrl, WCrr, the pistons push a pair of brake pads received in each caliper, whereby the brake pads pinch each associated disc rotor DRfl, DRfr, DRrl or DRrr rotating bodily with the associated wheel Wfl, Wfr, Wrl or Wrr, from opposite sides thereby to stop the rotation of each disc rotor DRfl, DRfr, DRrl or DRrr.

Further, the motion control system for the vehicle is provided with a motion control ECU 36 which is able to communicate interactively with the foregoing engine control ECU 20, the driving power distribution controller 21 and the brake force control device 35. The motion control ECU 36 is a control device for controlling the motion (i.e., the vehicle posture or behavior) of the vehicle (e.g., a control device for performing ESC (side slip prevention control)) and calculates various physical quantities upon receiving respective detection signals from a steering angle sensor 37a, a yaw rate sensor 38 and a lateral acceleration sensor 39 and respective detection signals from wheel speed sensors Sfl, Sfr, Srl, Srr which respectively detect the wheel speeds of the wheels Wfl, Wfr, Wrl, Wrr. The motion control ECU 36 is operable to calculate a steering angle $\xi$ which is outputted from the steering angle sensor 37a in correspondence to the manipulation amount of a steering 37 by the driver, to calculate an actual yaw rate based on a detection signal which is outputted from the yaw rate sensor 38 in correspondence to the yaw rate actually occurring on the vehicle, and to calculate an actual lateral acceleration based on a detection signal which is outputted from the lateral acceleration sensor 39 in correspondence to the lateral acceleration actually generated on the vehicle. Further, the motion control ECU 36 is also operable to calculate wheel speeds of the wheels Wfl, Wfr, Wrl, Wrr and the vehicle speed (vehicle body speed). The yaw rate sensor 38 and the lateral acceleration sensor 39 are mounted on a place adjacent to the gravity center of the vehicle.

In order to execute a motion control (e.g., ESC) of the vehicle, the motion control ECU 36 is operable to output an ESC command signal to the brake force control device 35. The ESC is a control for preventing the vehicle from side-slipping by determining a controlled object wheel (or wheels) in dependence on the state of the vehicle and then by applying a brake force (or forces) to the controlled object wheel (or wheels). For example, when the vehicle is in the state of understeer, the brake forces are applied to inside wheels during a turn as the control object wheels, whereas when the vehicle is in the state of oversteer, the brake forces are applied to outside wheels during the turn as the controlled object wheels.

Further, the motion control ECU 36 is operable to output a driving power command signal to the engine control ECU 20. The engine control ECU 20 receives the driving power command signal and controls the driving power source control means so that the driving power of the driving power source comes to correspond to the driving power command signal. Further, the motion control ECU 36 is able to output a driving power distribution command signal to the driving power distribution controller 21. The driving power distribution controller 21 receives the driving power distribution command signal and controls the driving forces of the left and light front and rear wheels so that the distribution comes to correspond to the driving power distribution command signal.

In addition, the motion control ECU 36 has a microcomputer (not shown), which is provided with an input/output interface, a CPU, a RAM and a ROM (all not shown) which are interconnected by means of a bus. The CPU executes a program corresponding to flow charts shown in FIGS. 2 to 4, and when the vehicle is under the rolling liability, the CPU controls the motion of the vehicle in dependence on the degree of the rolling liability. The RAM is for temporarily storing variables which are necessary in executing the program, and the ROM is for storing the program.

(Operation)

Figure 2:
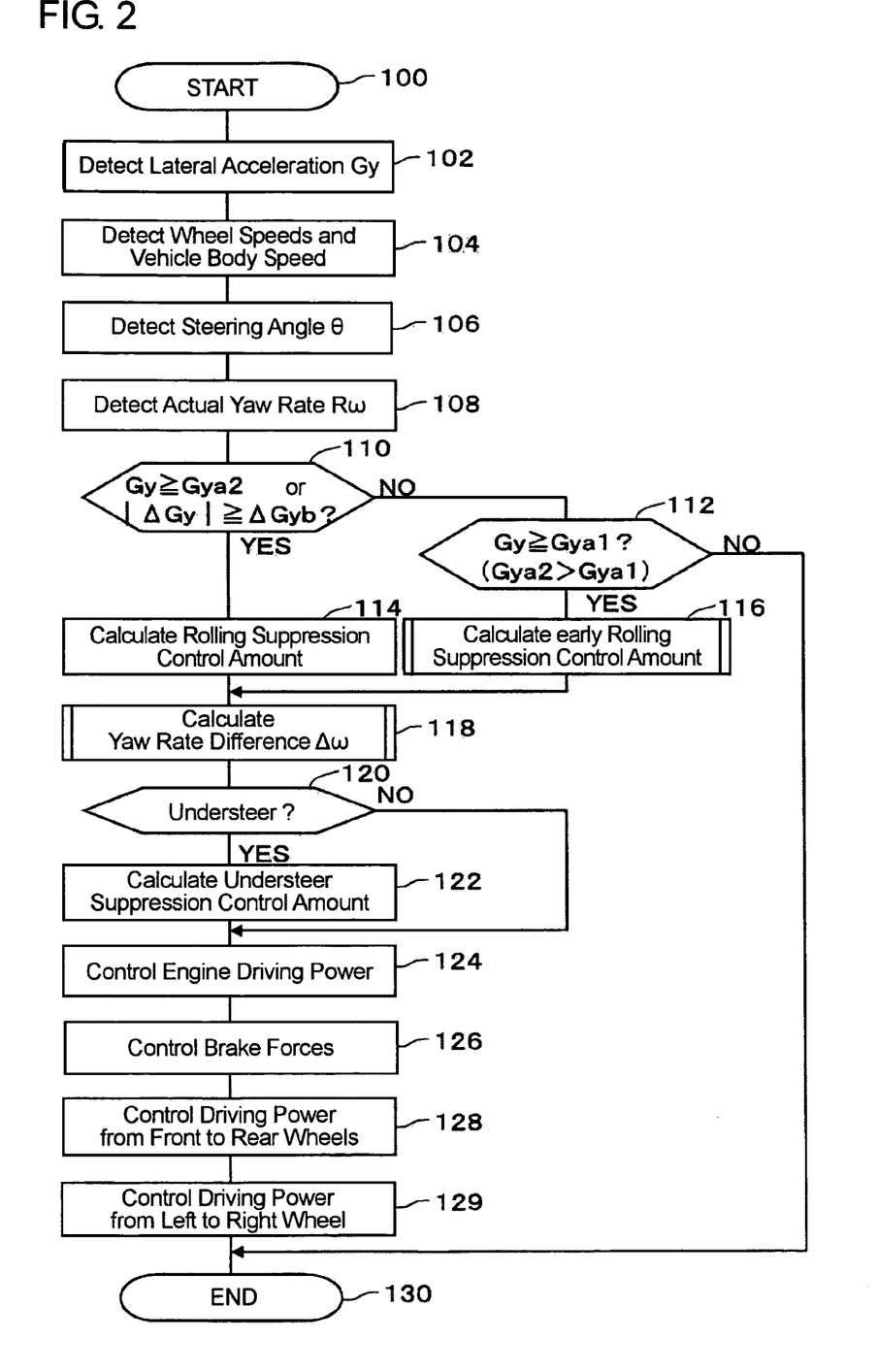
FIG. 2 is a flow chart of a control program executed by a motion control ECU shown in FIG. 1.

Next, the operation of the vehicle motion control system as constructed above will be described in accordance with the flow charts shown in FIGS. 2 to 4. While an ignition switch (not shown) is in ON state, the motion control ECU 36 repetitively executes the program corresponding to the aforementioned flow charts at predetermined short time intervals. Whenever initiating the execution of the program at step 100 in FIG. 2, the motion control ECU 36 detects the lateral acceleration Gy, the respective wheel speeds Vfl, Vfr, Vrl, Vrr, the vehicle body speed V, the steering angle θ and the actual yaw rate Rω (steps 102 to 108).

Figure 5:
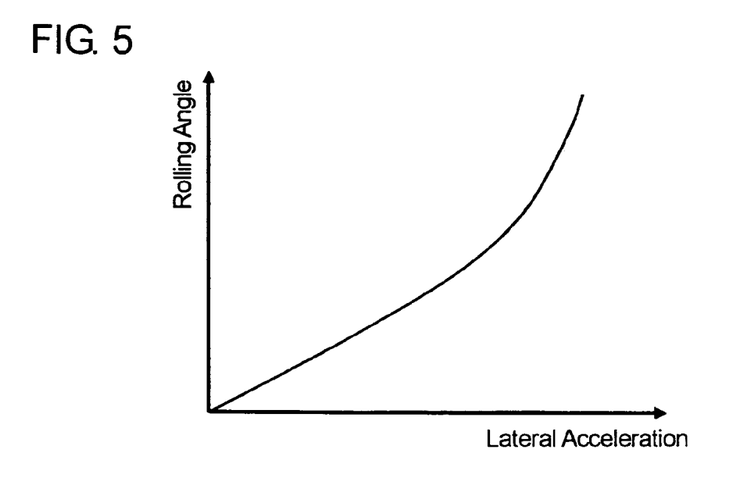
FIG. 5 is a map showing the relation between the lateral acceleration and the rolling angle (rolling liability)

First of all, the motion control ECU 36 at step 102 detects a signal from the lateral acceleration sensor 39 indicating the direction and magnitude of the lateral acceleration, as an actual lateral acceleration Gy which is being generated on the vehicle. As shown in FIG. 5, the lateral acceleration Gy has a good correlation with the rolling liability (the rolling angle). Accordingly, by detecting the lateral acceleration Gy, it is possible to detect the rolling liability of the vehicle (vehicle rolling liability detecting means). The method of detecting the vehicle rolling liability may not only limited to the method of detecting the lateral acceleration Gy, but may also be attained by detecting the rolling angular velocity about the gravity center of the vehicle by the use of a rolling angular velocity sensor and then by integrating the detected value. Besides, it is also possible to detect the rolling liability of the vehicle based on the vehicle height or the vertical acceleration which is detectable by a vehicle height sensor or a vertical direction acceleration sensor.

The motion control ECU 36 at step 104 calculates the wheel speeds Vfl, Vfr, Vrl, Vrr of the respective wheels Wfl, Wfr, Wrl, Wrr and the vehicle body speed V (wheel speed detecting means and vehicle body speed detecting means). More specifically, based on respective pulse train signals which are inputted respectively from the wheel speed sensors Sfl, Sfr, Srl, Srr, those values which are inversely proportional to the frequencies of the respective pulse train signals are calculated as the respective wheel speeds Vfl, Vfr, Vrl, Vrr. Then, an average value of these wheel speeds is calculated as the vehicle body speed V. In a modified form, the vehicle body speed V to be calculated may be an average value of the left and right front wheels Wfl, Wfr or the left and right rear wheels Wrl, Wrr. In another modified form, a vehicle speed sensor for picking up the rotation speed of an output shaft of the transmission 12 to output a pulse train signal which is inversely proportional to the rotational speed may be connected to the motion control ECU 36, and based on the pulse train signal inputted from the vehicle speed sensor, the motion control ECU 36 may calculate as the vehicle speed V a value which is inversely proportional to the frequency of the pulse train signal.

The motion control ECU 36 at step 106 calculates the steering angle θ of the vehicle M. That is, as indicated in Expression 1 noted below, the steering angle θ is calculated by incrementing or decrementing a preceding or last steering angle θ by a predetermined angle Δθ, in dependence on the rotational direction of a steering shaft (steering 37) each time changes are made in the levels of both of two phase pulse train signals inputted from the steering angle sensor 37a. The rotational direction of the steering shaft can be detected in dependence on the manner in which the two phase pulse train signals change the levels.

Steering Angle θ=Last Steering Angle θ+Additional Value×Δθ     (Expression 1)

The additional value in the above expression denotes the rotational direction of the steering 37 and can be determined based on the manners in which changes are made in the last value and the present value of the two phase pulse train signals inputted from the steering angle sensor 37a. For example, the additional value is 0 if the last value and the present value are the same to be (0, 0), is +1 if the last value (0, 0) changes to the present value (0, 1), or is −1 if the last value (0, 0) changes to the present value (1, 0).

Right after the ignition switch (not shown) is turned on, the initial value of the steering angle θ is reset to 0, based on which the calculations of the subsequence steering angles θ are executed. Further, because the steering angle θ indicates a relative angle from the initial value, but does not indicate any absolute angle, a neutral position of the steering angle θ is calculated, and an absolute steering angle θ from the neutral position can be calculated for the first time as a result of being compensated by the calculated neutral position.

The motion control ECU 36 at step 108 detects a signal of the yaw rate sensor 38 which signal is indicative of the direction and the magnitude of the yaw rate, as an actual yaw rate Rω being actually occurring on the vehicle (actual yaw rate detecting means). In a modified form, the actual yaw rate Rω may be calculated based on the wheel speeds of the left and right front wheels Wfl, Wfr (or the left and right rear wheels Wrl, Wrr).

When completing the detections of the aforementioned various parameters, the motion control ECU 36 judges the rolling liability of the vehicle. More specifically, the motion control ECU 36 at step 110 judges (as second rolling liability judgment means) whether or not the lateral acceleration Gy previously detected at step 102 is equal to or greater than a second predetermined rolling liability (e.g., a second lateral acceleration judgment value Gya2). Further, the motion control ECU 36 at step 110 also judges whether or not the change rate in the rolling liability of the vehicle is equal to or greater than a predetermined value. More specifically, a calculation is made for an absolute value of the change rate ΔGy in the lateral acceleration Gy detected previously at step 102, and a judgment is made of whether the absolute value |ΔGy| is equal to or greater than the predetermined value ΔGyb.

Then, as first rolling liability judgment means, the motion control ECU 36 at step 112 judges whether or not the lateral acceleration Gy detected previously at step 102 is equal to or greater than a first predetermined rolling liability (i.e., a first lateral acceleration judgment value Gya1) which is less than the second predetermined rolling liability.

Thus, when judging that the change rate in the rolling liability of the vehicle is equal to or greater than the predetermined value or that the rolling liability of the vehicle is equal to or greater than the second predetermined rolling liability, the motion control ECU 36 makes a judgment of "YES" at step 110 and proceeds the program to step 114 to calculate a rolling suppression control amount so that the control for suppressing the rolling is performed by decelerating the vehicle in the same manner as the prior art.

Figure 3:
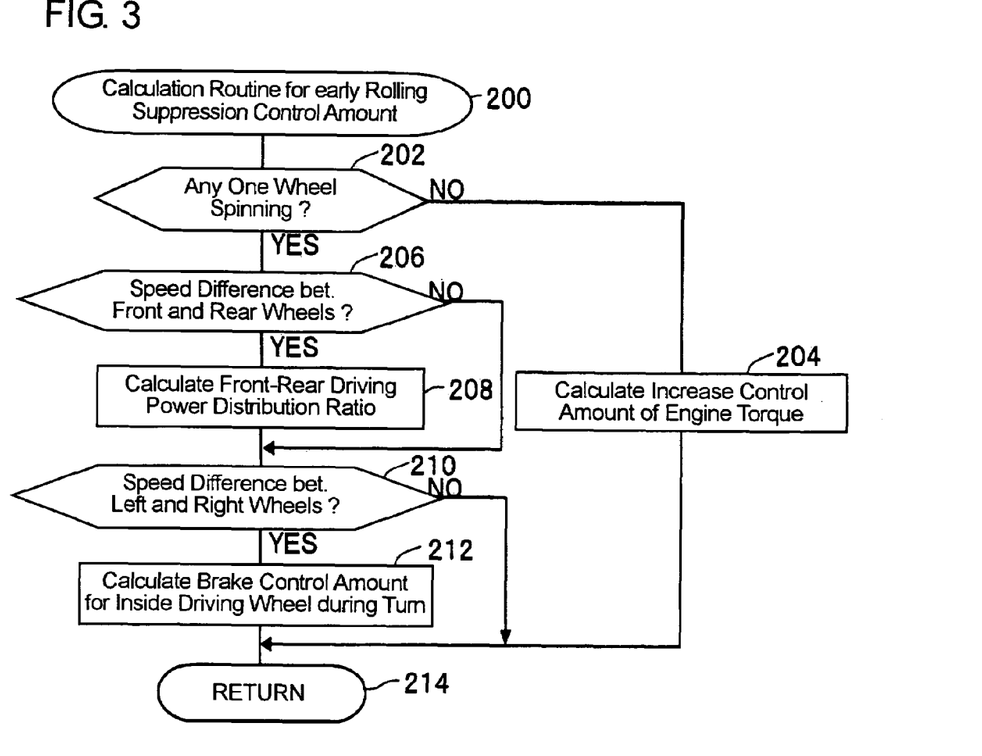
FIG. 3 is a flow chart executed by the motion control ECU shown in FIG. 1 for the calculation of an early rolling suppression control amount.

Further, when judging that the change rate in the rolling liability of the vehicle is less than the predetermined value and that the rolling liability of the vehicle is equal to or greater than the first predetermined rolling liability and less than the second predetermined rolling liability, the motion control ECU 36 makes judgments of "NO" and "YES" respectively at steps 110, 112 and proceeds the program to step 116 to calculate a rolling suppression control amount so that the control for suppressing the early rolling (i.e., the rolling at the early stage of rolling occurrence) is performed by increasing the driving forces of predetermined wheels which are different from those in the prior art, as described later in detail in accordance with the flow chart shown in FIG. 3.

Further, when judging that the change rate in the rolling liability of the vehicle is less than the predetermined value and that the rolling liability of the vehicle is less than the second predetermined rolling liability, the motion control ECU 36 makes a judgment of "NO" at each of steps 110, 112 and proceeds the program to step 130 without executing the control for suppressing the rolling to halt the present flow chart.

Figure 6:
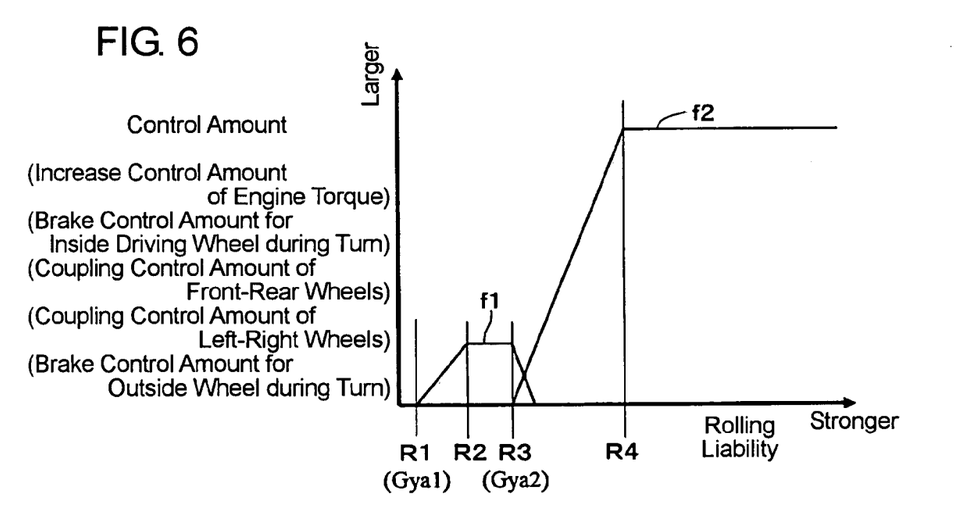

The motion control ECU 36 at step 114 derives a rolling suppression control amount for suppressing an over-rolling. For example, when the vehicle is to be decelerated by applying brake forces to the outside wheels during a turn, derivation (calculation) is made for control amounts (brake control amounts) of brake forces to be applied the outside wheels during the turn. In this case, the brake control amounts corresponding to the rolling liability detected previously at step 102 are derived based on a map f2 (or a calculation expression) which defines the relation between the rolling liability and the brake control amount for the outside wheel during a turn as shown in FIG. 6. The map f2 shown in FIG. 6 is set so that when the rolling liability is equal to or greater than a predetermined value R3 and less than a predetermined value R4, the brake control amount becomes larger as the rolling liability becomes larger and is also set that when the rolling liability is equal to greater than the predetermined value R4, the brake control amount remains constant regardless of the increase in the rolling liability. The predetermined value R3 corresponds to the second predetermined rolling liability. Under a brake force control referred to later, the motion control ECU 36 is operable to output the brake control amount obtained at this step, as the ESC command signal to the brake force control device 35.

Further, where the output torque of the engine 11 is to be reduced to decelerate the vehicle, the motion control ECU 36 derives an output torque regulation amount (reduced amount) for the engine 11. Also in this case, an output torque regulation amount corresponding to the rolling liability is derived based on a map which defines the relation between the rolling liability and the engine torque regulation amount (reduced amount) and which is similar to the map (or the calculation expression) defining the relation between the rolling liability (rolling behavior) and the brake control amount for the outside wheel during a turn as indicated by the solid line in FIG. 6.

The motion control ECU 36 at step 116 executes the program in accordance with a calculation routine for an early rolling suppression control amount shown in FIG. 3 and derives a rolling suppression control amount for suppressing the early rolling. That is, the kind of a suppression control and the wheel to be controlled thereunder are determined in dependence on the rotational states of the respective wheels, and a suppression control amount which is to be applied to the wheel is derived.

The motion control ECU 36 at step 202 judges whether or not any one wheel of the wheels is spinning, that is, rotating without catching the road surface. At this time, the motion control ECU 36 calculates the respective differences between the vehicle body speed V and the wheel speeds Vfl, Vfr, Vrl, Vrr which have been calculated at the aforementioned step 104, and judges that each wheel having the difference is spinning if the difference is greater than a predetermined difference or that each wheel having the difference is not spinning if not so.

When none of the wheels is spinning, that is, when all of the wheels are not spinning, the motion control ECU 36 makes a judgment of "NO" at step 202 to advance the program to step 204. Then, the motion control ECU 36 at step 204 derives an engine torque increase control amount for the engine 11. In this case, the engine torque increase control amount corresponding to the rolling liability is derived based on the map f1 (or a calculation expression) defining the relation between the rolling liability (rolling behavior) and the engine torque increase control amount. It is to be noted that the map f1 also defines the relation between the rolling liability and a front-rear wheel coupling control amount, the relation between the rolling liability and a left-right wheel coupling control amount and the relation between the rolling liability and a turn inside driving wheel brake control amount, which relations will be referred to later in detail.

The map f1 shown in FIG. 6 is set so that when the rolling liability is equal to or greater than a predetermined value R1 and less than another predetermined value R2, the engine torque increase control amount becomes larger as the rolling liability becomes larger, and is also set so that when the rolling liability is equal to or greater than the predetermined value R2 and less than the predetermined value R3, the engine torque increase control amount remains constant regardless of the increase in the rolling liability. The predetermined value R1 corresponds to the first predetermined rolling liability. At step 124 where the motion control ECU 36 serves as engine driving power control means as described later, the motion control ECU 36 calculates a driving power command signal by adding the engine torque increase control amount obtained here to the present driving power command signal and outputs the calculated driving power command signal to the engine control ECU 20.

When any one wheel of the wheels is spinning, on the contrary, the motion control ECU 36 makes a judgment of "YES" at step 202 and advances the program to step 206. Through the processing including step 206 to step 212, the motion control ECU 36 judges whether or not a speed difference exists between the front and rear wheels and between the left and right wheels, and calculates a front-rear wheel coupling control amount and a turn inside driving wheel brake control amount in dependence on the judgment results.

The motion control ECU 36 at step 206 judges whether or not a speed difference exists between the front and rear wheels. More specifically, the motion control ECU 36 calculates the difference between an average value of the wheel speeds Vfl, Vfr of the left and right front wheels Wfl, Wfr and an average value of the wheel speeds Vrl, Vrr of the left and right rear wheels which speeds have been calculated at the aforementioned step 104, and judges that the speed difference exists between the front and rear wheels if the difference is equal to or greater than a predetermined value, but judges that the speed difference does not exist between the front and rear wheels if not.

When the speed difference exists between the front and rear wheels, the motion control ECU 36 at step 206 makes a judgment of "YES" to advance the program to step 208. At step 208, the motion control ECU 36 derives a front-rear wheel coupling control amount representing the front-rear driving power distribution ratio. In this case, a front-rear wheel coupling control amount corresponding to the rolling liability is derived based on the map f1 (or the calculation expression) defining the relation between the rolling liability (rolling behavior) and the front-rear wheel coupling control amount as shown in FIG. 6. The front-rear driving power distribution ratio is 100:0 when the front-rear wheel coupling control amount is 0 and is 50:50 when the front-rear wheel coupling control amount is the maximum value.

The map f1 shown in FIG. 6 is set so that when the rolling liability is equal to or greater than the predetermined amount R1 and less than the predetermined amount R2, the front-rear wheel coupling control amount becomes larger, that is, the driving power distribution ratio is changed from 100:0 to 50:50, as the rolling liability becomes larger, and is also set so that when the rolling liability is equal to or greater than the predetermined amount R2 and less than the predetermined amount R3, the front-rear wheel coupling control amount remains constant (i.e., 50:50 at the driving power distribution ratio) even if the rolling liability becomes larger. The predetermined amount R1 corresponds to the first predetermined rolling liability. At step 128 where the motion control ECU 36 serves as front-rear wheel driving power control means as described later, the motion control ECU 36 converts the front-rear wheel coupling control amount obtained here into a corresponding driving power distribution ratio and outputs the converted driving power distribution ratio as a driving power command signal to the driving power distribution controller 21.

Accordingly, the motion control ECU 36 calculates the front-rear wheel coupling control amount to advance the program then to step 210 when the speed difference exists between the front wheels and the rear wheels, while making a judgment of "NO" at step 206 to advance the program to step 210 when the speed difference does not exist between the front wheels and the rear wheels.

At step 210, the motion control ECU 36 judges whether or not a speed difference exists between the left and right front wheels. Specifically, the motion control ECU 36 calculates the difference between the wheel speed Vfl of the left front wheel Wfl and the wheel speed Vfr of the right front wheel Wfr which have been calculated at the aforementioned step 104, and judges that the speed difference exists between the left and right front wheels if the difference is equal to or greater than a predetermined value, but judges that the speed difference does not exist between the left and right front wheels if not.

When the speed difference exists between the left and right front wheels, the motion control ECU 36 makes a judgment of "YES" at step 210 and advances the program to step 212. Then, at step 212, the motion control ECU 36 derives a turn inside driving wheel brake control amount (e.g., a brake control amount for the inside front driving wheel during a turn).

In this case, the turn inside driving wheel brake control amount corresponding to the rolling liability is derived based on the map f1 (or the calculation expression) defining the relation between the rolling liability (rolling behavior) and the turn inside driving wheel brake control amount as shown in FIG. 6.

The map f1 shown in FIG. 6 is set so that when the rolling liability is equal to or greater than the predetermined amount R1 and less than the predetermined amount R2, the turn inside driving wheel brake control amount becomes larger as the rolling liability becomes larger, and is also set so that when the rolling liability is equal to or greater than the predetermined amount R2 and less than the predetermined amount R3, the turn inside driving wheel brake control amount remains constant even if the rolling liability becomes larger. The predetermined amount R1 corresponds to the first predetermined rolling liability. At step 126 where the motion control ECU 36 serves as brake force control means as described later, the motion control ECU 36 outputs the turn inside driving wheel brake control amount obtained here as the ESC command signal to the brake force control device 35.

Accordingly, the motion control ECU 36 calculates the turn inside driving wheel brake control amount to advance the program then to step 214 when the speed difference exists between the left and right front wheels, while making a judgment of "NO" at step 210 to advance the program to step 214 when the speed difference does not exist between the left and right front wheels. Thus, the motion control ECU 36 terminates the processing of the present subroutine and advances the program to step 118 shown in FIG. 2. It is to be noted that although the turn inside front driving wheel is set as the controlled object wheel in this particular embodiment, the turn inside rear driving wheel may be set as the controlled object wheel.

Figure 8:
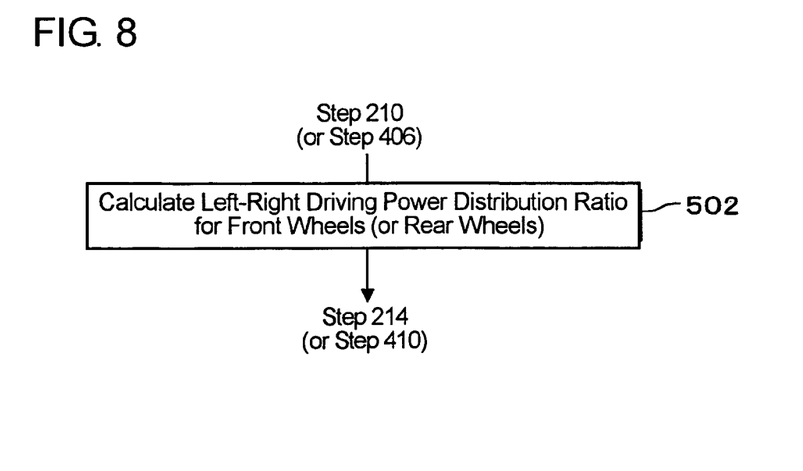
FIG. 8 is a partial flow chart showing a processing which is executed in place of step 212 of the flow chart for the calculation of the early rolling suppression control amount shown in FIG. 3.

Although the motion control ECU 36 operates to derive the turn inside driving wheel brake control amount at step 212, it may be modified to execute a processing at step 502 shown in FIG. 8 in place of the processing at step 212. At step 502, the motion control ECU 36 operates to derive the left-right wheel coupling control amount representing the left-right driving power distribution ratio. In this case, the left-right wheel coupling control amount corresponding to the rolling liability is derived based on the map f1 (or the calculation expression) defining the relation between the rolling liability (rolling behavior) and the left-right wheel coupling control amount as shown in FIG. 6. The left-right driving power distribution ratio is 50:50 when the left-right wheel coupling control amount is 0, and is 100:0 (or 0:100) when the left-right wheel coupling control amount is the maximum value.

The map f1 shown in FIG. 6 is set so that when the rolling liability is equal to or greater than the predetermined amount R1 and less than the predetermined amount R2, the left-right wheel coupling control amount becomes larger, that is, the left-right driving power distribution ratio is changed from 50:50 to 100:0 (or 0:100) as the rolling liability becomes larger, and is also set so that when the rolling liability is equal to or greater than the predetermined amount R2 and less than the predetermined amount R3, the left-right wheel coupling control amount remains constant (i.e., the left-right driving power distribution ratio is constant at 50:50) even if the rolling liability becomes larger. The predetermined amount R1 corresponds to the first predetermined rolling liability. At step 129 where the motion control ECU 36 serves as left-right wheel driving power control means as described later, the motion control ECU 36 converts the left-right wheel coupling control amount obtained here into a corresponding driving power distribution ratio and outputs the converted driving power distribution ratio as the ESC command signal to the driving power distribution controller 21.

Accordingly, the motion control ECU 36 calculates the left-right wheel coupling control amount to advance the program then to step 214 when the speed difference exists between the left and right front wheels (or between the left and right rear wheels).

Further, the motion control ECU 36 may be modified to execute the both processing of the aforementioned steps 212 and the step 502.

Figure 4:
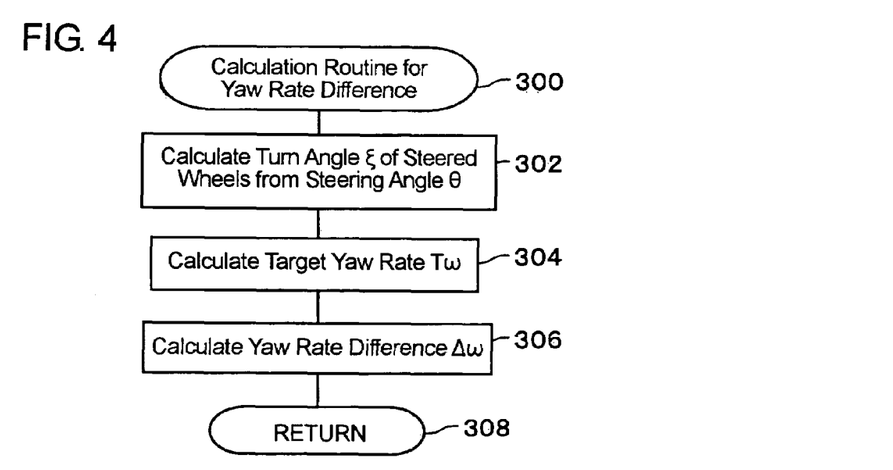
FIG. 4 is a flow chart executed by the motion control ECU shown in FIG. 1 for the calculation of a yaw rate difference.

The motion control ECU 36 at step 118 executes the program in accordance with a yaw rate difference calculation routine shown in FIG. 4 and calculates a yaw rate difference $\Delta\omega$ for judgment of whether or not the vehicle is under the understeer.

As steered angle deriving means, the motion control ECU 36 at step 302 derives the turn angle $\xi$ of the steered wheels (steered angle of the vehicle) from the steering angle $\theta$ which has been calculated at the aforementioned step 106, by the use of the following expression 2.

Turn Angle $\xi$ of Steered Wheels=$C$×Steering Angle $\theta$  (Expression 2)

Herein, symbol C denotes a constant of proportionality in calculating the turn angle $\xi$ of the steered wheels from the steering angle $\theta$. It is to be noted that the turn angle $\xi$ of the steered wheels means the angle which the steered direction of the steered wheels makes with the straight-ahead direction of the vehicle M.

As target yaw rate calculating means, the motion control ECU 36 at step 304 calculates a target yaw rate $T\omega$ of the vehicle based on a stability factor A which represents the easy-to-steer property of the vehicle. More specifically, the motion control ECU 36 calculates the target yaw rate $T\omega$ based on the vehicle body speed V, the steered angle $\xi$ of the vehicle and the stability factor A by the use of the following expression 3.

$$T\omega=(V\times\xi)/(L\times(A\times V^2+1))$$  (Expression 3)

In the expression above, symbol L denotes the wheelbase of the vehicle M.

Thereafter, the motion control ECU 36 derives the yaw rate difference $\Delta\omega$ at step 306 as yaw rate difference calculating means. More specifically, the yaw rate difference $\Delta\omega$ ($\Delta\omega=T\omega-R\omega$) is calculated by the subtraction between the previously detected actual yaw rate $R\omega$ and the target yaw rate $T\omega$ calculated at step 304. Then, the program is advanced to step 308 to terminate the present subroutine and is advanced to step 120 shown in FIG. 2.

The motion control ECU 36 at step 120 judges whether or not the vehicle is under the understeer by the comparison of an understeer suppression control intervention threshold value having been set in advance with the yaw rate difference $\Delta\omega$ calculated at step 118. The vehicle is judged to be under the understeer if the yaw rate difference $\Delta\omega$ exceeds the understeer suppression control intervention threshold value, and is judged not to be under the understeer if not.

When the vehicle is under the understeer, the motion control ECU 36 makes a judgment of "YES" at step 120 and advances the program to step 122. Subsequently, at step 122, the motion control ECU 36 calculates an understeer suppression control amount for the execution of the understeer suppression control on the vehicle in dependence on the comparison result at step 120. In this case, the understeer suppression control amount corresponding to the difference between the yaw rate difference $\Delta\omega$ and the understeer suppression control intervention threshold value is derived based the result of a comparison, for example, based on a map (or a calculation expression) not shown which defines the relation between the difference of the yaw rate difference Δω from the understeer suppression control intervention threshold value and the understeer suppression control amount.

Accordingly, when the vehicle is under the understeer, the motion control ECU 36 calculates the understeer suppression control amount and then advances the program to step 124. Further, also when the vehicle is not under the understeer, the motion control ECU 36 makes a judgment of "NO" at step 120 and advances the program to step 124.

Thereafter, at step 124, the motion control ECU 36 increases the driving forces of the wheels by increasing the driving power (output torque) of the engine 11 by the driving power source control means for controlling the engine 11 being the driving power source of the vehicle. Specifically, the engine torque increase control amount calculated (derived) at the aforementioned step 204 is added to a present driving power command signal to make a driving power command signal, which is then outputted to the engine control ECU 20. Upon receipt of the driving power command signal, the engine control ECU 20 controls the driving power source control means, whereby the driving power of the driving power source becomes as commanded by the driving power command signal. At this time, the understeer suppression control amount calculated at step 122 has been added to the driving power command signal.

At step 126, the motion control ECU 36 increases the driving force of a predetermined driving wheel by suppressing the spinning of the predetermined driving wheel by the brake force control device 35 which serves as brake force control means for controlling brake forces applied to the wheel of the vehicle. That is, where one wheel (e.g. inside front wheel during a turn) of the driving wheels is spinning, the driving force of the one wheel is becoming small, in which case a brake force is applied to the one spinning wheel to revive the road gripping force thereof, whereby the driving force can be increased. Specifically, the brake control amount which is calculated (derived) at the aforementioned step 212 for the inside front wheel during the turn is outputted as the ESC command signal to the brake force control device 35. Upon receipt of the ESC command signal, the brake force control device 35 applies a brake force corresponding to the brake control amount, to the controlled object wheel (inside front wheel during the turn). At this time, the understeer suppression control amount calculated at step 122 has been added to the ESC command signal.

At step 128, the motion control ECU 36 increases the driving forces of the front wheels or the rear wheels by changing the distribution of the driving power to the front and rear wheels by the front-rear driving power distribution control actuator 13 for distributing the driving power from the driving power source for the vehicle to the front and rear wheels. Specifically, the front-rear driving power distribution ratio calculated (derived) at the aforementioned step 208 is outputted as the driving power distribution command signal to the driving power distribution controller 21. Upon receipt of the driving power distribution command signal, the driving power distribution controller 21 controls the front-rear driving power distribution control actuator 13, whereby the driving power distribution becomes as commanded by the driving power distribution command signal. At this time, the understeer suppression control amount calculated at step 122 has been added to the driving power distribution command signal.

At step 129, the motion control ECU 36 increases the driving force of the left front driving wheel (and/or the left rear driving wheel) or the right front driving wheel (and/or the right rear driving wheel) by changing the distribution of the driving power to the left and right front wheels (and/or the left and right rear wheels) by the front left-right driving power distribution control actuator 15 (and/or the rear left-right driving power distribution control actuator 18) for distributing the driving power from the front-rear driving power distribution control actuator 13 to the left and right front wheels (and/or the left and right rear wheels). Specifically, the left-right driving power distribution ratio calculated (derived) at the aforementioned step 502 is outputted as the driving power distribution command signal to the driving power distribution controller 21. Upon receipt of the driving power distribution command signal, the driving power distribution controller 21 controls the front left-right driving power distribution control actuator 15 (and/or the rear left-right driving power distribution actuator 18), whereby the driving power distribution becomes as commanded by the driving power distribution command signal. At this time, the understeer suppression control amount calculated at step 122 has been added to the driving power distribution command signal.

Upon termination of the processing at step 129, the motion control ECU 36 advances the program to step 130 to terminate the present flow chart temporarily.

As is clear from the foregoing description, in the present embodiment, when the rolling liability of the vehicle becomes equal to or greater than the first predetermined rolling liability as a result that the vehicle begins to turn with a gas pedal being stepped by the driver or in the traveling by inertia of the vehicle with the brake pedal 31 being not stepped, control is performed to suppress the rolling liability of the vehicle by increasing the driving force of any of the wheels of the vehicle. Consequently, the control which is capable of suppressing the rolling liability of the vehicle without substantially giving the driver an unpleasant feeling against his manipulation is performed from the early stage of the rolling occurrence before the rolling becomes large, so that a good drive feeling can be given to the driver.

Further, since the driving force of the wheel is increased by increasing the driving power of the engine 11 mounted on the vehicle by the driving power source control means (composed of the throttle valve 11b, the motor 11c and the throttle opening degree sensor 11d) for controlling the engine 11 of the vehicle, it is possible to easily execute the suppression control of the vehicle rolling liability by utilizing the existing construction.

Further, since the driving forces of the front wheels or the rear wheels are increased by changing the distribution of the driving power to the front and rear wheels by the front-rear driving power distribution control actuator 13 which serves as the front-rear driving power distribution control means for distributing the driving power from the engine 11 to the front and rear wheels, it is possible to easily execute the suppression control of the vehicle rolling liability by utilizing the existing construction.

Further, since the driving forces of the driving wheels are increased by suppressing the spinning of the vehicle driving wheels by the brake force control device 35 which serves as brake force control means for controlling the brake forces applied to the wheels of the vehicle, it is possible to easily execute the suppression control of the vehicle rolling liability by utilizing the existing construction.

Further, since the driving force of the left driving wheel or the right driving wheel is increased by changing the distribution of the driving power to the left and right wheels by the front left-right driving power distribution control actuator 15 (and/or the rear left-right driving power distribution control actuator 18) which serves as the left-right driving power distribution control means for distributing the driving power from the engine 11 of the vehicle to the left and right driving wheels, it is possible to easily execute the suppression control of the vehicle rolling liability by utilizing the existing construction.

Further, the first rolling liability judging means (step 112) judges whether or not the rolling liability which is detected by the rolling liability detecting means (step 102; the lateral acceleration sensor 39) for detecting the rolling liability of the vehicle is equal to or greater than the first predetermined rolling liability. When the first rolling liability judging means judges that the rolling liability detected by the rolling liability detecting means is equal to or greater than the first predetermined rolling liability, the rolling suppression control means (steps 116, 124 to 129) increases the driving force of any of the vehicle wheels to suppress the rolling liability of the vehicle. Thus, when the rolling liability of the vehicle becomes equal to or greater than the first predetermined rolling liability as a result that the vehicle begins to turn with the gas pedal being stepped by the driver or in the traveling by inertia of the vehicle with the brake pedal 31 being not stepped, control is performed to suppress the rolling liability of the vehicle by increasing the driving force of any of the wheels of the vehicle. Consequently, the control which is capable of suppressing the rolling liability of the vehicle without substantially giving the driver an unpleasant feeling against his manipulation is performed from the early stage of the rolling occurrence before the rolling becomes large, so that a good drive feeling can be given to the driver.

Further, since the rolling suppression control means (steps 116, 124 to 129) changes the increase amount of the driving force of the wheels in dependence on the degree of the rolling liability, it is possible to perform an appropriate rolling suppression control which conforms to the rolling liability.

Further, since the rolling suppression control means (steps 116, 124 to 129) increases the driving forces of the wheels by increasing the driving power of the driving power source mounted on the vehicle by the driving power source control means (composed of the throttle valve 11*b*, the motor 11*c* and the throttle opening degree sensor 11*d*) for controlling the driving power source (i.e., the engine 11) of the vehicle, it is possible to easily execute the suppression control of the vehicle rolling liability by utilizing the existing construction.

Further, since the rolling suppression control means (steps 116, 124 to 129) increases the driving forces of the front wheels or the rear wheels by changing the distribution of the driving power to the front and rear wheels by the front-rear driving power distribution control actuator 13 which serves as the front-rear driving power distribution control means for distributing the driving power from the driving power source of the vehicle to the front and rear wheels, it is possible to easily execute the suppression control of the vehicle rolling liability by utilizing the existing construction.

Further, since the rolling suppression control means (steps 116, 124 to 129) increases the driving forces of the driving wheels by suppressing the spinning of the driving wheel (or wheels) of the vehicle by the brake force control device 35 which serves as the brake force control means for controlling the brake forces applied to the wheels of the vehicle, it is possible to easily execute the suppression control of the vehicle rolling liability by utilizing the existing construction.

Further, since the rolling suppression control means (steps 116, 124 to 129) increases the driving forces of the left driving wheel (or wheels) or the right driving wheel (or wheels) by changing the distribution of the driving power to the left and right wheels by the left-right driving power distribution control means for distributing the driving power from the driving power source of the vehicle to the left and right wheels, it is possible to easily execute the suppression control of the vehicle rolling liability by utilizing the existing construction.

Further, the second rolling liability judging means (step 110) is provided for judging whether or not the rolling liability detected by the rolling liability detecting means (step 102: the lateral acceleration sensor 39) is equal to or greater than the second predetermined rolling liability which is greater than the first predetermined rolling liability, and the rolling suppression control means (steps 114, 116, 124 to 129) suppresses the vehicle rolling liability by increasing the driving force of any of the vehicle wheels when the first rolling liability judging means (step 112) judges that the rolling liability detected by the rolling liability detecting means is equal to or greater than the first predetermined rolling liability, and also suppresses the vehicle rolling liability by decelerating the vehicle when the second rolling liability judging means (step 110) judges that the rolling liability detected by the rolling liability detecting means is equal to or greater than the second predetermined rolling liability. Therefore, it is possible to perform the rolling suppression control appropriately from the early stage to the limit stage of the rolling liability.

Further, since the vehicle is decelerated to suppress the vehicle rolling liability (steps 110, 114, 124 to 129) when the change rate of the vehicle rolling liability is equal to or greater than a predetermined value, it is possible to suppress the vehicle rolling liability appropriately by decelerating the vehicle without increasing the driving forces of the wheels even at the early stage of the rolling when the change rate of the rolling liability is large.

Further, the rolling suppression control means (steps 114, 116, 124 to 129) increases the driving forces of the front wheels or the rear wheels by increasing the driving power of the driving power source mounted on the vehicle when none of the wheels is spinning or by changing the distribution of the driving power to the front and rear wheels when at least any one of the wheels is spinning and when the speed difference exists between the front and rear wheels. In addition, the rolling suppression control means (steps 114, 116, 124 to 129) increases the driving forces of the driving wheels by suppressing the spinning of the vehicle driving wheels and/or by changing the distribution of the driving power to the left and right wheels when at least any one of the wheels is spinning and when the speed difference exists between the left and right wheels. Therefore, it is possible to perform the rolling suppression control of the vehicle by utilizing the engine driving power effectively.

(Other Modifications)

Figure 7:
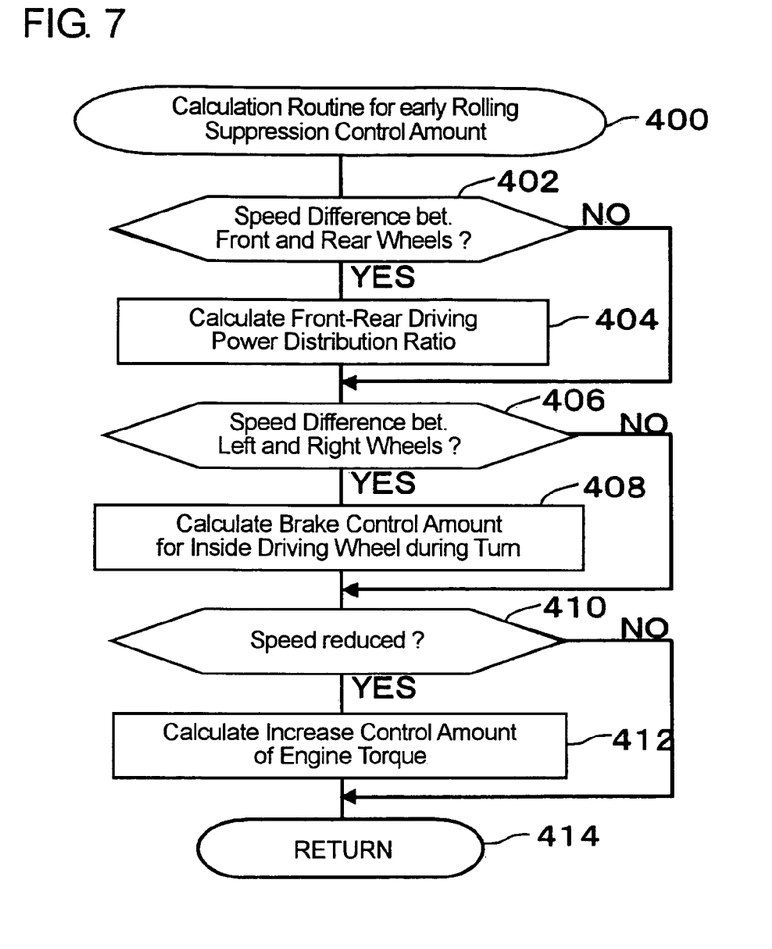
FIG. 7 is a flow chart executed by the motion control ECU shown in FIG. 1 for the calculation of the early rolling suppression control amount in a modified form.

Although in the foregoing embodiment, the calculation for the early rolling suppression control amount at step 116 is made in accordance with the subroutine shown in FIG. 3, it may instead be made in accordance with a subroutine shown in FIG. 7. Specifically, at steps 402 to 408, the motion control ECU 36 first executes a processing similar to that executed from the aforementioned step 206 to the step 212. That is, the front-rear driving power distribution ratio is calculated (step 404) when the speed difference exists between the front and rear wheels, and the brake control amount for the inside driving wheel during a turn is calculated (step 408) when the speed difference exists between the left and right front wheels. In this case, step 402 serves as front-rear wheel speed difference judging means for performing the same processing as the step 206, and step 406 serves as left-right wheel speed difference judging means for performing the same processing as step 210. In a modified form, the processing at the aforementioned step 502 or both of the processing at step 408 and the processing at step 502 may be executed in place of the processing of the step 408.

Then, as vehicle speed reduction judging means, the motion control ECU 36 at step 410 judges whether or not the vehicle speed V at the time of the present processing cycle is reduced in comparison with the vehicle speed V at the time of the last processing cycle. If the vehicle speed has been reduced, the motion control ECU 36 makes a judgment of "YES" at step 410 and advances the program to step 412. Then, the motion control ECU 36 derives an engine torque increase control amount corresponding to a torque which compensates the vehicle speed V for the reduced amount. At step 124 where the motion control ECU 36 serves as engine driving power control means, the motion control ECU 36 adds the engine torque increase control amount obtained here to the present driving power command signal to make a driving power command signal and outputs the same to the engine control ECU 20.

With this modified construction, the rolling suppression control means (steps 114, 116, 124 to 129) increases the driving forces of the front wheels or the rear wheels by changing the distribution of the driving power to the front and rear wheels when the speed difference exists between the front and rear wheels, or increase the driving forces of the driving wheels by suppressing the spinning of the vehicle driving wheels and/or by changing the distribution of the driving power to the left and right wheels, or increases the driving power of the driving power source mounted on the vehicle when the vehicle body speed is reduced. Accordingly, by executing the rolling suppression control on the vehicle without reducing the vehicle body speed, it can be realized to give the driver a sporty drive feeling.

Further, for increasing the driving forces of the predetermined wheels, the foregoing embodiment uses the driving power source control means (composed of throttle valve 11b, the motor 11c and the throttle opening degree sensor 11d) for controlling the vehicle engine 11, the front-rear driving power distribution control actuator 13 which serves as the front-rear driving power distribution control means for distributing the driving power from the vehicle engine 11 to the front and rear wheels, the front left-right driving power distribution control actuator 15 (and/or the rear left-right driving power distribution control actuator 18) which serve as the left-right driving power distribution control means, and the brake force control device 35 which serves as the brake force control means for controlling the brake forces to the vehicle wheels. However, another modification may be made to use at least one of these for that purpose.

Further, although the foregoing embodiment uses the vacuum type booster as booster device, there may be made still another modification, wherein a hydraulic pressure generated by a pump is accumulated in an accumulator and is applied to a piston to boost the peddle stepping force exerted on the brake peddle 31.

Furthermore, the present invention is applicable to a vehicle which uses an electric motor as the driving power source of the vehicle, and is also applicable to a vehicle with a brake device of a so-called "brake-by-wire type".

Obviously, numerous further modifications and variations of the present invention are possible in light of the above teachings. It is therefore to be understood that within the scope of the appended claims, the present invention may be practiced otherwise than as specifically described herein.

What is claimed is:

1. A motion control system for a vehicle having at least two driving wheels which are driven by a driving power source, comprising:
   rolling liability detecting means for detecting the rolling liability of the vehicle;
   first rolling liability judging means for judging whether or not the rolling liability detected by the rolling liability detecting means is equal to or greater than a first predetermined rolling liability;
   second rolling liability judging means for judging whether or not the rolling liability detected by the rolling liability detecting means is equal to or greater than a second predetermined rolling liability which is greater than the first predetermined rolling liability; and
   rolling suppression control means for suppressing the rolling liability of the vehicle by increasing the driving force of any of the driving wheels at a first stage of the rolling liability when the first rolling liability judging means judges that the rolling liability detected by the rolling liability detecting means is equal to or greater than the first predetermined rolling liability,
   wherein the rolling suppression control means does not increase the driving force of any of the driving wheels at a second stage of rolling liability that is growing relative to the first stage when the second rolling liability judging means judges that the rolling liability detected by the rolling liability detecting means is equal to or greater than the second predetermined rolling liability.

2. The motion control system as set forth in claim 1, wherein at the first stage of the rolling liability of the vehicle, the rolling suppression control means changes the increase amount of the driving force of any of the driving wheels in dependence on the degree of the detected rolling liability.

3. The motion control system as set forth in claim 1, further comprising driving power source control means for controlling the driving power source of the vehicle, and wherein at the first stage of the rolling liability of the vehicle, the rolling suppression control means increases the driving force of any of the driving wheels by increasing the driving power of the driving power source.

4. The motion control system as set forth in claim 1, further comprising front-rear driving power distribution control means for distributing the driving power from the driving power source of the vehicle to front and rear wheels of the vehicle, and wherein at the first stage of the rolling liability of the vehicle, the rolling suppression control means increases the driving forces of the front wheels or the rear wheels by changing the distribution of the driving power to the front and rear wheels by the front-rear driving power distribution control means.

5. The motion control system as set forth in claim 1, further comprising brake force control means for controlling brake forces applied to the wheels of the vehicle, and wherein at the first stage of the rolling liability of the vehicle, the rolling suppression control means increases the driving force of any of the driving wheels of the wheels by suppressing the spinning of any such driving wheels by the brake force control means.

6. The motion control system as set forth in claim 1, further comprising left-right driving power distribution control means for distributing the driving power from the driving power source of the vehicle to left and right driving wheels of the vehicle, and wherein at the first stage of the rolling liability of the vehicle, the rolling suppression control means increases the driving force of the left driving wheel or the right driving wheel by changing the distribution of the driving power to the left and right driving wheels by the left-right driving power distribution control means.

7. The motion control system as set forth in claim 1, wherein:
the rolling suppression control means suppresses the rolling liability of the vehicle by decelerating the vehicle at the second stage of rolling liability when the second rolling liability judging means judges that the rolling liability detected by the rolling liability detecting means is equal to or greater than the second predetermined rolling liability.

8. The motion control system as set forth in claim 1, wherein the rolling suppression control means suppresses the rolling liability of the vehicle by decelerating the vehicle when the change rate of the vehicle rolling liability is equal to or greater than a predetermined value.

9. The motion control system as set forth in claim 1, further comprising:
wheel spinning judging means for judging whether or not any one wheel of the wheels of the vehicle is spinning;
front-rear wheel speed difference judging means for judging whether or not a speed difference exists between front and rear wheels of the vehicle; and
left-right wheel speed difference judging means for judging whether or not a speed difference exists between left and right wheels of the vehicle, and wherein at the first stage of the rolling liability of the vehicle, the rolling suppression control means:
(a) increases the driving power of the driving power source of the vehicle when the wheel spinning judging means judges that none of the wheels is spinning;
(b) increases the driving forces of the front wheels or the rear wheels by changing the distribution of the driving power to the front and rear wheels when the wheel spinning judging means judges that at least any one wheel of the wheels is spinning and when the front-rear wheel speed difference judging means judges that the speed difference exists between the front and rear wheels; and
(c) increases the driving forces of the driving wheels by suppressing the spinning of at least any one driving wheel and/or by changing the distribution of the driving power to the left and right wheels when the wheel spinning judging means judges that at least any such one wheel of the wheels is spinning and when the left-right wheel speed difference judging means judges that the speed difference exists between the left and right wheels.

10. The motion control system as set forth in claim 1, further comprising:
front-rear wheel speed difference judging means for judging whether or not a speed difference exists between front and rear wheels of the vehicle;
left-right wheel speed difference judging means for judging whether or not a speed difference exists between left and right wheels of the vehicle; and
vehicle speed reduction judging means for judging whether or not the vehicle speed is reduced, and wherein at the first stage of the rolling liability of the vehicle, the rolling suppression control means:
(d) increases the driving forces of the front wheels or the rear wheels by changing the distribution of the driving power from the driving power source of the vehicle to the front and rear wheels when the front-rear wheel speed difference judging means judges that the speed difference exists between front and rear wheels;
(e) increases the driving force of any of the driving wheels by suppressing the spinning of any such driving wheel and/or by changing the distribution of the driving power to the left and right wheels when the left-right wheel speed difference judging means judges that the speed difference exists between the left and right wheels; and
(f) increases the driving power of the driving power source when the vehicle speed reduction judging means judges that the vehicle speed is reduced.

* * * * *